United States Patent

Cavelos et al.

[11] Patent Number: 6,121,914
[45] Date of Patent: Sep. 19, 2000

[54] SIDELOBE CANCELLER WITH CORRELATION SIGNAL WEIGHT SAMPLING DURING TRANSIENT

[75] Inventors: Arthur A. Cavelos, North Syracuse; Robert D. King, Clay, both of N.Y.

[73] Assignee: Lockheed Martin Corporation, Syracuse, N.Y.

[21] Appl. No.: 05/596,711

[22] Filed: Jul. 17, 1975

[51] Int. Cl.[7] .................................................. G01S 7/36
[52] U.S. Cl. ............................ 342/16; 342/17; 342/379
[58] Field of Search ............................. 343/7 A, 100 LE; 342/16, 17, 18, 19, 39, 379, 382, 384

[56] References Cited

U.S. PATENT DOCUMENTS

| | | | |
|---|---|---|---|
| 3,881,177 | 4/1975 | Len et al. | 342/16 |
| 3,982,245 | 9/1976 | Soule, Jr. et al. | 342/379 |
| 4,044,359 | 8/1977 | Applebaum et al. | 342/379 |
| 4,075,633 | 2/1978 | Lewis | 342/381 |
| 4,586,045 | 4/1986 | Downie | 342/17 |
| 4,586,048 | 4/1986 | Downie | 342/379 |
| 4,689,628 | 8/1987 | Lewis | 342/384 |
| 5,049,890 | 9/1991 | Hansen | 342/384 |
| 5,162,805 | 11/1992 | Cantrell | 342/379 |
| 5,291,209 | 3/1994 | Evans et al. | 342/381 |
| 5,296,865 | 3/1994 | Lewis | 342/384 |
| 5,307,069 | 4/1994 | Evans | 342/19 |
| 5,442,365 | 8/1995 | Lewis et al. | 342/381 |

*Primary Examiner*—John B. Sotomayor
*Attorney, Agent, or Firm*—John J. Morrissey; Paul Checkovich

[57] ABSTRACT

An intermediate frequency sidelobe canceller of the kind including a cancellation loop and switch means for sampling and holding correlation weights present in the loop, affording enhanced cancellation and reduced loop lock-on time. This capability is achieved by provision of means for control of the sample-hold switch means so as to limit duration of the sampling interval to an optimum value substantially shorter than the loop stabilization time. Such shorter sampling interval may be either of fixed duration or adaptively controlled in response to one or more loop operating parameters.

7 Claims, 3 Drawing Sheets

TRANSIENT WEIGHT RESPONSE WITH CONTROLLED SATURATION

TRANSIENT WEIGHT RESPONSE WITHOUT CONTROLLED SATURATION

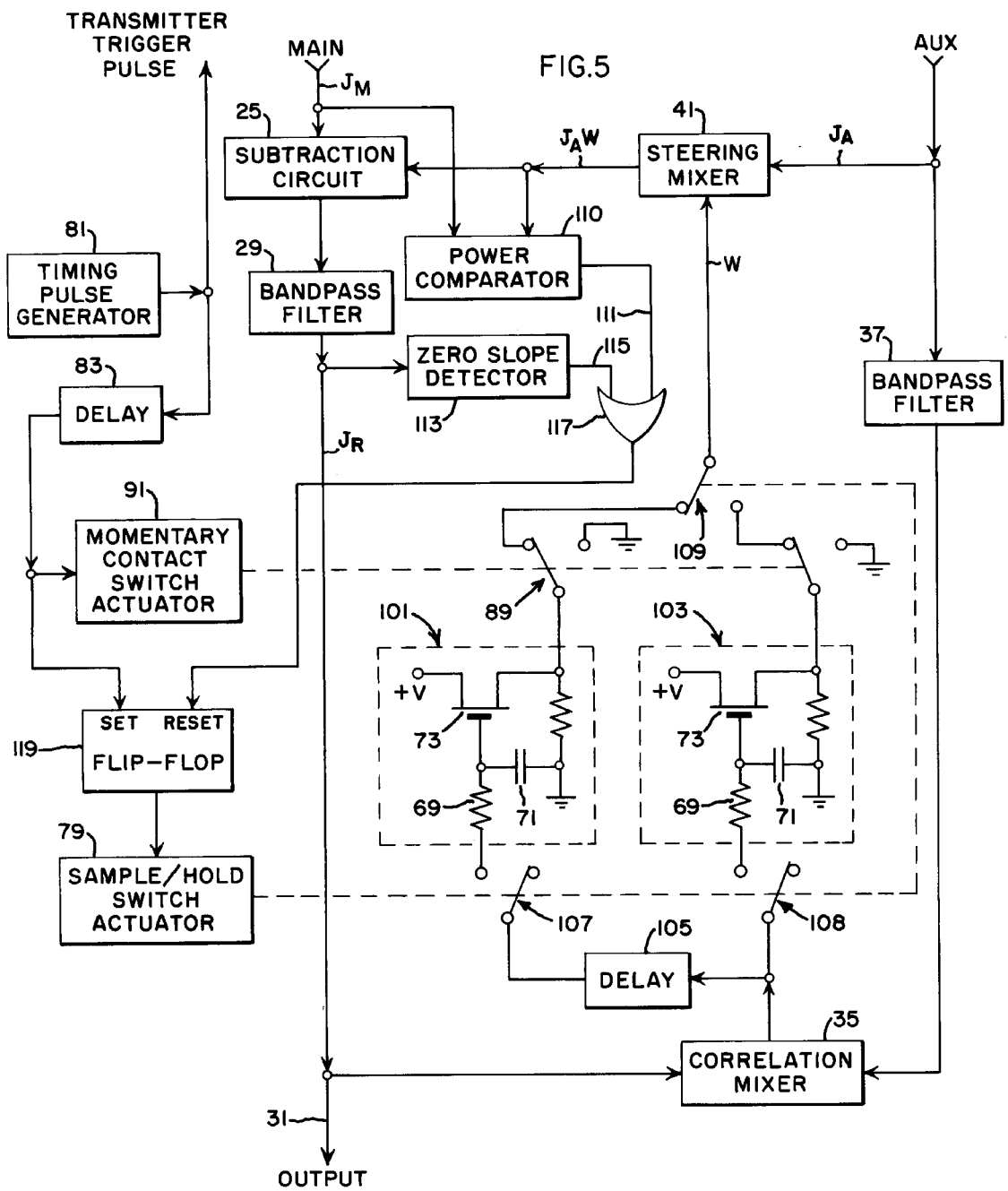

SIDELOBE CANCELLER WITH CORRELATION SIGNAL WEIGHT SAMPLING DURING TRANSIENT

The invention herein described was made in the course of or under a contract with the United States Army.

BACKGROUND OF THE INVENTION

This invention relates to signal processors for radar, sonar and like signal reception systems, and more particularly to sidelobe cancellation circuits for improved reception in the presence of jamming, interference and other noise signals as received by such systems.

Still more particularly, the present invention constitutes a refinement of the canceller correlation signal weighting techniques which are the subject of the copending application of Jureller and Soule, Ser. No. 488, 395 filed Jul. 15, 1974, of common assignment herewith. The invention of that application is in turn a refinement of the basic intermediate frequency sidelobe canceller circuit disclosed and claimed in U.S. Pat. No. 3,202, 990, which issued Aug. 24, 1965 to Paul W. Howells, and may embody also controlled saturation of the cancellation loop as disclosed in the copending application of Cavelos, Ser. No. 482, 078, filed Jun. 24, 1974, the patent and application being both also of common assignment herewith.

As more fully described in the aforementioned Jureller-Soule application, that invention affords improved capabilities against jamming signal inputs by isolating the cancellation loop against input of non-jammer signal energy such as attributable to clutter or to transmitted pulse energy which is cross-coupled between the transmitter and receiver. Such isolation of the cancellation loop avoids the compromise of its operation which could result from the necessity to accommodate clutter and other noise input, thus enhancing the loop's capabilities against jamming. In accordance with the Jureller-Soule invention, cancellation loop isolation is accomplished by interposing within the loop a "sample-and-hold" switching device which first makes and then breaks the loop at that point, to hold whatever correlation signal weighting exists at the end of each of the sampling periods thus established.

Such sampling periods preferably are synchronized with respect to the pulse transmitter, so as to occur at a time within the interpulse period at which the interference signal input to the canceller loop is primarily of jammer origin and comprises little if any clutter or other non-jammer interference content. In this way the canceller loop's capabilities against jamming signal input are preserved uncompromised by efforts of the loop also to cancel clutter and the like, for which other remedies are known and available.

In implementing cancellation circuits in accordance with the Jureller-Soule invention, the sampling period normally is made of duration sufficiently long to permit the canceller loop more than adequate time to lock onto the jamming signal input and to settle or stabilize the loop before the sampling switch is opened to hold the correlation signal weighting thus established in the loop. While sample-and-hold switching in this manner provides canceller loop operation which is fully adequate for most applications, it is the purpose of the present invention to further improve canceller loop capabilities in systems using sample-and-hold switching of this kind, to provide enhanced cancellation and also to reduce the transient or lock-on period during which some portion of the jamming signal will remain uncancelled by the canceller. These improvements in cancellation ratio and loop lock-on time in accordance with the present invention are accomplished with little if any additional circuit complexity and at little or no. additional cost in implementation, as will become apparent from their description hereinafter.

SUMMARY OF THE INVENTION

In carrying out the invention in its presently preferred embodiment in a pulsed radar system, a single or multiple loop sidelobe canceller having a sample-hold switch interposed in the cancellation loop includes means for timing the operation of that switch so as to limit the duration of the sampling period to an optimum value which is substantially shorter than the time period necessary for the loop to fully settle or stabilize after input of a jamming signal to the loop. Such shorter sampling period may be determined by means operable to define the period as of predetermined fixed duration or, alternatively, the sampling period may be terminated by means which sense one or more parameters of canceller loop operation and respond thereto to provide adaptive control of loop performance. In either case, the sampling period desirably is appropriately synchronized with respect to the transmitted pulse so as to be positioned at a point in time in the interpulse period such that it will include primarily jamming signal input to the loop and to exclude non-jammer interference. In implementing the adaptive sampling embodiment, in which the sampling period duration is under control of means which sense and respond to an operating condition of the canceller loop, the sample-hold switch means preferably include a delay element so that the signal actually held represents a value of correlation signal weighting which existed at a point in time sufficiently prior to the sampling switch actuation to compensate for the inherent delay of the sensing and switch control elements.

BRIEF DESCRIPTION OF THE DRAWING

FIG. 5 is a block diagram of an alternative embodiment of the invention employing adaptive sampling.

DESCRIPTION OF THE PREFERRED EMBODIMENT

Figure 1:
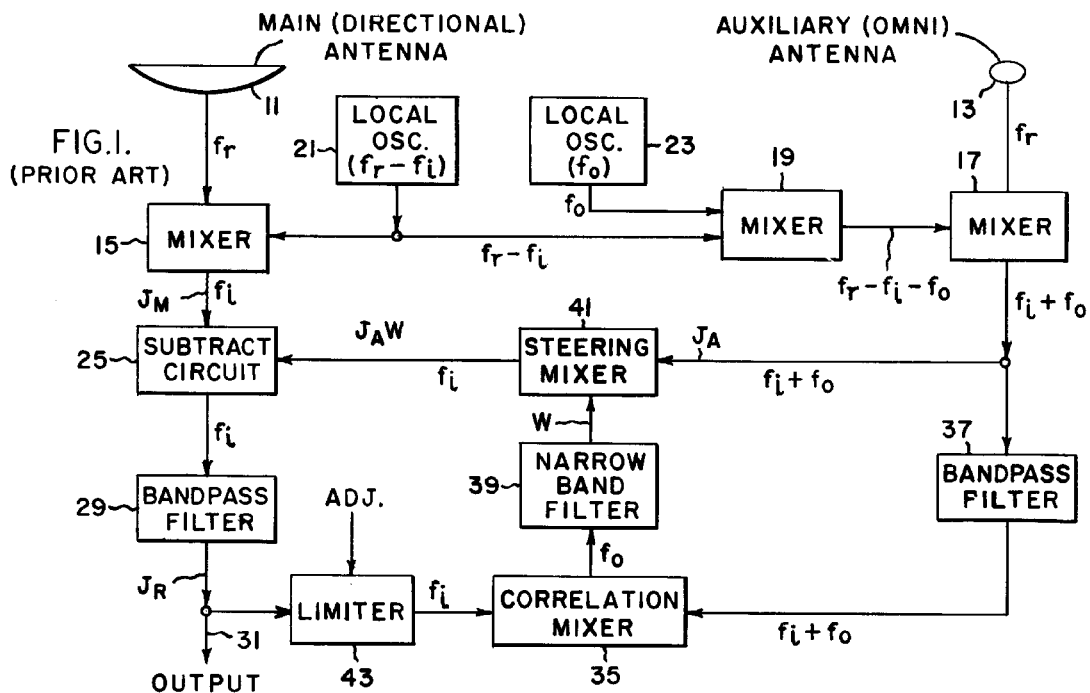
FIG. 1 is a block diagram of a prior art sidelobe cancellation circuit similar to that of the aforementioned Howells patent and including loop saturation control in accordance with the aforementioned Cavelos co-pending application.

With continued reference to the drawings, FIG. 1 illustrates a sidelobe canceller circuit based on that of the aforementioned Howells—U.S. Pat. No. 202, 990. As shown, the cancellation loop comprises main and auxiliary channels to which the respective signal inputs are provided by a directional antenna 11 and an omnidirectional antenna 13, the latter preferably being located in close proximity to the main or directional antenna. The basic function of the cancellation loop is to cancel, from the signal as received by the main antenna, any jamming signal content received through a sidelobe of that antenna. This is desirable because even though the antenna sidelobes may be many decibels down from the mainlobe, the very high power levels which are typical of jamming and other interference signals may still be troublesome when introduced through an antenna sidelobe. Power levels of desired signals such as target reflections often are so much below interference signal power levels that the higher gain of the antenna mainlobe as compared to its sidelobes is insufficient to enable detection of mainlobe target signals masked by sidelobe interference.

To accomplish cancellation of such sidelobe interference in accordance with the Howells patent, the main and omni antenna signals at radio frequency ($f_r$) are reduced to intermediate frequency by first mixers 15 and 17, respectively, to which the local oscillator inputs are offset by a frequency $f_O$. This may be accomplished as illustrated at 19 by mixing the outputs of two local oscillators 21 and 23 the latter of which introduces the desired offset frequency.

The main channel signal $J_M$, which may include both mainlobe target signal content and sidelobe interference or noise signal content at the IF frequency ($f_i$), is applied as one input to a subtraction circuit 25. The other input to this circuit is a correction or cancellation signal derived as hereinafter explained from the auxiliary channel signal $J_A$. Circuit 25 subtracts the latter input from the former in conventional manner. The product of this subtraction, with bandpass filtering at 29, represents the desired or target signal from which any jamming signal content has been substantially wholly cancelled, and it becomes the main channel output at 31 as indicated.

For generating the correction or cancellation signal to be applied to subtraction circuit 25, the cancellation loop comprises cross-correlation means for comparing the auxiliary channel signal, in which it will be recalled that the jamming signal is of relatively high power level as compared to any target or other desired signal content, and the loop output signal at 31 which contains the desired or target signal plus any residual jamming signal component $J_R$ not cancelled in the subtraction circuit 25. These signals are compared in a correlation mixer 35, to which the auxiliary channel signal is supplied through a bandpass filter 37.

If correspondence is found between these signal inputs to the correlation mixer 35, as will be the case if there is any residue ($J_R$) of the jamming signal remaining in the canceller output at 31, this will give rise to a correlation signal output from mixer 35. This signal, after narrowband filtering at 39, is applied as a weighting signal (W) to a steering mixer 41 which has as its second input the auxiliary channel signal $J_A$ and which forms part of a compensating cross-feed network providing, as output, the correction signal $J_A W$ to subtraction circuit 25. This signal is of the same frequency ($f_i$) as the main channel signal $J_M$ at the point of subtraction in circuit 25.

Further detail on circuit parameters and component selection in a sidelobe canceller of the kind just described will be found in Howells—U.S. Pat. No. 202, 990, together with an analysis of the operation of the cancellation loop in terms of mathematical relations between the signals which are provided as input to the loop and signals generated within the loop. Since these relations are complex and full description of them necessarily lengthy, reference is made to the Howells patent for such analysis and detailed description, and only the general principles of operation of the circuit will be summarized here.

In brief, such sidelobe cancellers function in the general manner of closed-loop servo systems wherein the error signal is constituted by any residue or uncancelled jamming signal which remains in the main channel output, the presence of such jamming signal residue being sensed by cross-correlation, in mixer 35, with the jamming signal as present in the auxiliary channel input to that mixer. Whenever such error or residue is sensed, the correlation mixer output as subsequently filtered and combined with the compensating cross-feed network operates to generate a correction or cancellation signal which is of phase and amplitude such that when subtracted at 25 from the main channel signal the residue or uncancelled content thereof is reduced accordingly. The loop will continue to respond to any residual error and, after a lock-on period which is of duration determined primarily by the loop time constant and which in radar applications typically may be of the order of a few microseconds, will reduce the interference signal residue to near zero.

In accordance with the invention of the aforementioned copending application of Cavelos, the basic sidelobe canceller circuit just described may further include an overload limiter 43 interposed in the canceller loop at the particular point illustrated in FIG. 1. With such limiter adjusted or selected so as not to affect steady state conditions and to limit only during transients as explained in the Cavelos application, the jamming signal power level at which the loop saturates may be controlled so as to result in canceller loop transient weight response characteristics generally as illustrated in FIG. 2, which represents typical response characteristics of a canceller circuit with a limiter chosen to saturate at a jamming signal power level about −25 db below the anticipated maximum.

Figure 2:
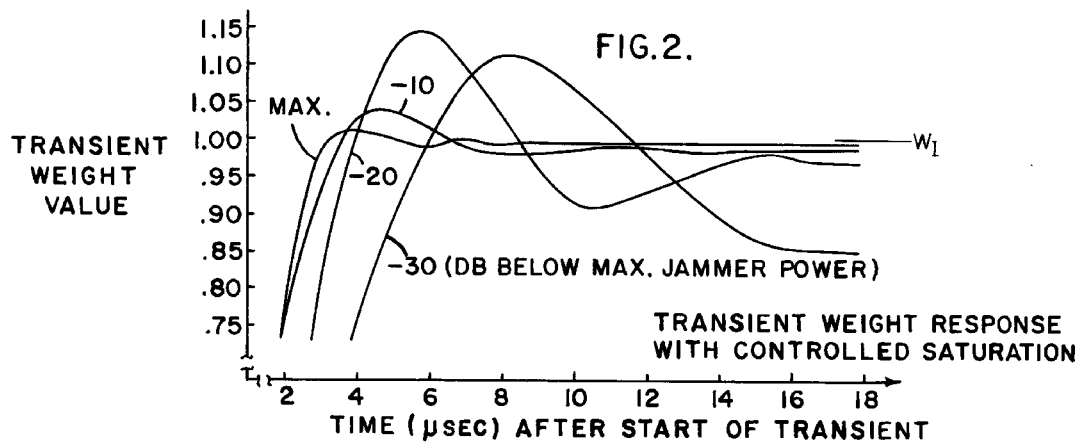
FIG. 2 is a plot illustrating relationships of transient weights against elapsed time in a canceller of the kind shown in FIG. 1, operating against different jamming power levels.

In FIG. 2 the transient weight value is plotted versus time, with zero on the time axis representing the start of the transient, i.e., the moment of loop closure or first reception of a jammer signal, for four different jamming signal power levels ranging from an arbitrary or anticipated maximum power level (the curve of which is designated "MAX") down to 30 db below that maximum. The ideal weighting ($W_I$) for complete cancellation is represented by the value 1.0, and it will be noted that for all jamming signal power levels the steady state weighting, i.e., the value of weighting on which the loop settles as it reaches stabilization, will be somewhat removed from the ideal weighting $W_I$ because, as with any servo system, there necessarily is some finite deadband in the servo loop.

It will be noted that in all cases shown the transient weight value passes through the ideal weighting ($W_I$) at a point in time substantially earlier than the loop stabilization time, i.e., the time at which the loop finally settles on its steady state weighting value, and that for the three curves of jammer power levels above the −25 db level at which the loop saturates, the point in time at which the value $W_I$ is first passed through is approximately the same, being in all cases between about 3.4 and 3.9 microseconds after start of the transient. From FIG. 2 it is apparent that if these earlier attained optimized weights could be detected, held and subsequently employed as the operative weights in the cancellation loop, there would result a significant improvement in cancellation ratio, over the ratio which results when the circuit is permitted to stabilize at the normal steady state weights. Further, there would also be a substantial reduction in the time required for the loop to reach this optimum value of cancellation signal weighting.

In accordance with the present invention, such improvements in cancellation ratio and cancellation loop "lock-on" time may be realized using sample-and-hold circuitry basically similar to that disclosed in the aforementioned Jureller-Soule copending application, with the provision of additional means for timing the operation of the sample-hold switch interposed in the cancellation loop so as to limit the duration of each sampling period to an optimum value which is substantially shorter than the time period necessary for the loop to fully settle or stabilize after being initially closed.

Figure 3:
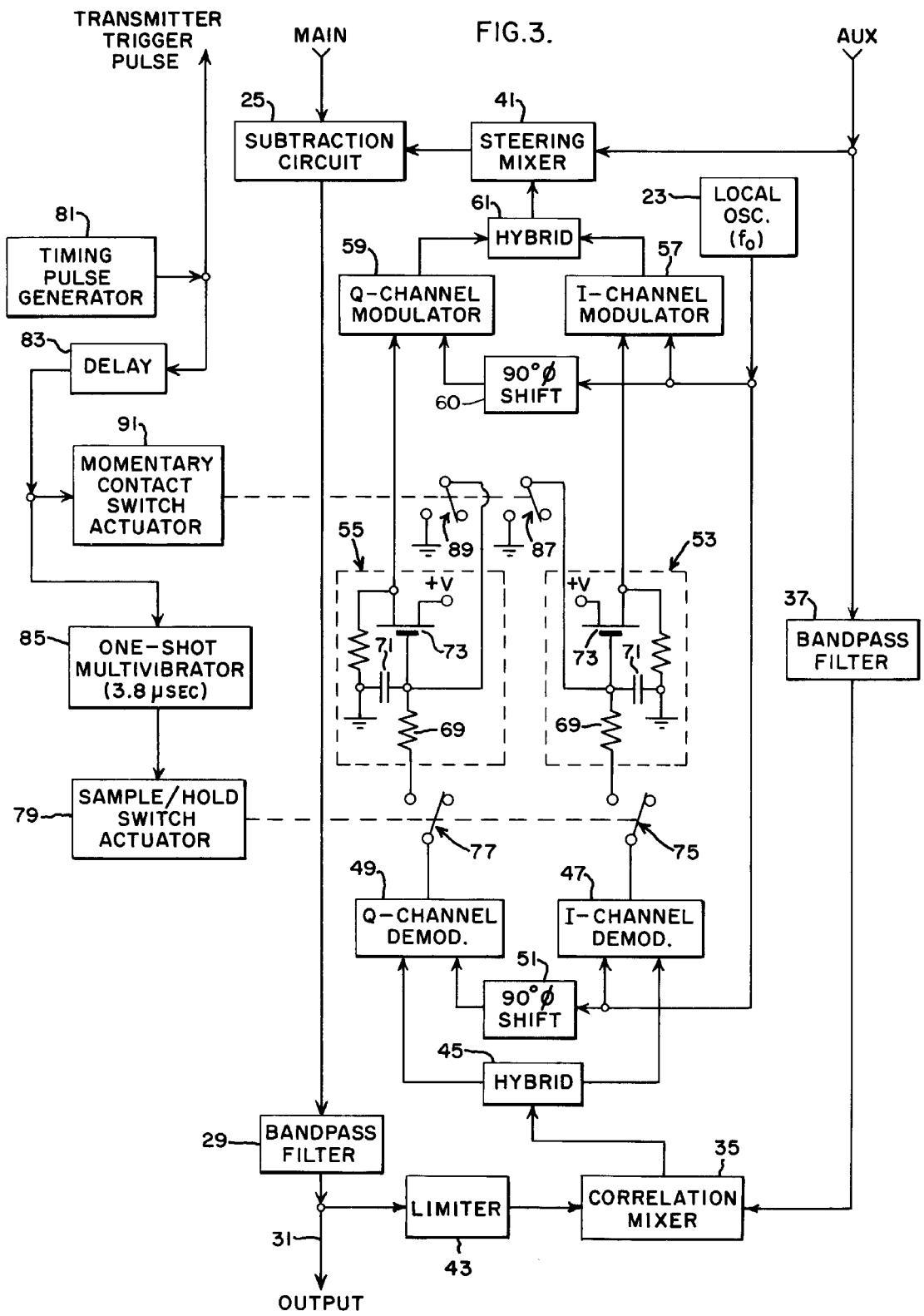
FIG. 3 is a block diagram of a cancellation circuit similar to that of FIG. 1 but modified to provide transient weight sampling in accordance with the present invention.

Such shorter sampling period may be controlled in any of several different ways two of which are illustrated in FIGS. 3 and 5, where FIG. 3 shows perhaps the simplest embodiment of the invention in which the sampling interval is of predetermined fixed duration. Such fixed duration sampling intervals are particularly suitable with controllable saturation loops, because as shown in FIG. 2 the operation of the saturation control is such that for all jammer power signal levels above saturation, the curves of transient weight values versus time pass through the $W_f$ or optimum value quite closely in time. It is possible, therefore, to select a particular value of time, such for example as about 3.8 microseconds in the case of the particular circuit the characteristics of which are illustrated in FIG. 2, to provide a sampling interval duration at least approximately optimized for all values of jammer signal power levels above saturation. Below that level, as indicated by the −30 db curve in FIG. 2, for example, the transient weight value thus derived may be substantially removed from the optimum, but since the jammer signal here is of such relatively low level to begin with its less-than-optimum cancellation still does not result in objectionably high jammer signal levels in the final output of the canceller loop.

Referring again to FIG. 3, the sample-hold switching preferably is introduced into the correlation signal branch of the cancellation loop, i.e., the branch including the correlation signal integrating filter. This is so because the bandwidth of this integrating filter is the narrowest of all the loop components and control of its operation accordingly has the effect of controlling operation of the entire loop.

In the preferred embodiment the very narrow bandwidth for the correlation signal integrating filter which is desired for optimized canceller operation is accomplished by demodulation of the correlation signal at IF, to derive its in-phase (I) and quadrature (Q) components at baseband; the I and Q signals thus derived then are low-pass filtered, and finally are remodulated and recombined to yield the desired correlation signal output again at the original IF frequency. Narrow-band filtering in this way provides an output which is identical to the input within the constraints of the low-pass filter, some proportionality constant in amplitude, and a constant in phase.

In FIG. 3 the splitting of the correlation signal output from mixer 35 and I and Q components is accomplished in a 90° hybrid 45, and the I and Q channel signals then are demodulated at 47 and 49, respectively, by phase detection relative to the I and Q components of a reference signal from a reference oscillator 23 of frequency ($f_o$) equal to the frequency difference between the main and auxiliary channels. The necessary phase relationship between the in-phase and quadrature signal components is maintained by a 90° phase shifter 51 as indicated.

The I and Q baseband frequency signals are narrow-band filtered at 53 and 55, respectively, and the signals then applied to modulators 57 and 59 where they remodulate the reference oscillator signal. A second 90° phase shifter 60 maintains the proper phase relationship between the I- and Q-channel modulator outputs. The products of this remodulation are combined in a second 90° hybrid 61 to yield the final correlation signal output to the steering mixer 41, for generation of a correction signal there in the manner hereinbefore described in reference to FIG. 1.

The narrowband filter elements 53–55, when operating at baseband frequency as above described, may be low-pass filters of conventional configuration, comprising one or more RC filter stages 69–71 of which only one is shown. The filtered signal is applied to the base of the field effect transistor 73 which is biased as shown for essentially zero base current flow and has its output coupled to the following modulator.

Interposed before each of the narrowband filters 53 and 55 are sample-and-hold switch elements 75 and 77, respectively, the function of which is to make and break the I and Q channel circuits at this point and to hold whatever value of correlation signal is present at the moment of such break. The two switches 75 and 77 both may be operated by a single actuator 79, which in this embodiment operates under the control of means periodically effective to close these switches for a time period of predetermined fixed duration and occurring at a predetermined point in the transmitter interpulse period.

To provide such synchronization of operation of the sample-hold switches 75 and 77 with the system transmitter, the transmitter trigger pulse which in conventional radar systems commonly is provided by a timing pulse generator, as at 81, may be coupled through a fixed time delay element as at 83 which operates to position the sample-hold interval at the desired point within the transmit interpulse period. Normally, the sample-hold interval is positioned toward the end of the interpulse period, as this minimizes noise input to the cancellation loop attributable to nearby clutter and other strong signals from sources other than jammers.

To determine the duration of the sample-hold interval, the delayed trigger pulse from delay element 83 is applied to a one-shot multivibrator 85 which, in response thereto, provides as output a pulse of fixed time duration. This pulse is applied to the sample-hold switch actuator 79 so as to energize the switch actuator through that fixed time period, to thus hold switches 75 and 77 in their "make" positions therethrough. Typically, the period of the one-shot multivibrator 85 will be from perhaps as little as one microsecond to as much as 20 microseconds; the particular value selected for this parameter will depend upon cancellation loop gain, saturation level and other factors discussed in greater detail hereafter.

With narrowband filters of the particular configuration illustrated at 53 and 55, whatever charges exist on the capacitors 71 at the moment of break of the associated switch 75 or 77 will remain there indefinitely, since the capacitors have no discharge path. Capacitors 71 thus serve both as elements of the low-pass filters and as the memory elements for the signal "hold" functions as described.

To assure that such stored or "held" value from one cycle of system operation is not still present to affect operation during the next following cycle, means preferably are provided for shorting the capacitor charges to ground at the start of each cycle. To this end, momentary contact switches 87 and 89 connected as shown operate under control of a second switch actuator 91 to provide the desired momentary contact through these switches at the start of each sample-hold period. While the momentary contact switches, as well as the sample-hold switches 75 and 77, have been shown by way of illustration as mechanical switches, they would normally be implemented as electronic switches capable of cyclical operation at the radar transmitter pulse repetition rate.

In operation of the circuit of FIG. 3, with the sample-hold switches 75–77 and momentary contact switches 87 and 89 all in the position shown, any charges present on the capacitors 71 at the start of the cycle will remain there, since the capacitors have no discharge paths. The correlation signal outputs to the I and Q channel modulators 57 and 59 accordingly will also be held at this constant value. Then at some point in time following the transmitter trigger pulse, after a time delay controlled by fixed delay element 83, the one-shot multivibrator 85 is triggered to energize switch actuator 79, thereby closing switches 75 and 77 and holding those switches closed through the period of the multivibrator output pulse, which in the exemplary embodiment of FIG. 3 is as previously indicated about 3.8 microsecond. At the start of this 3.8 microsecond pulse, switch actuator 91 also will be energized momentarily, to provide momentary contact through switches 87 and 89 thereby grounding capacitors 71 and discharging them.

Upon restoration of switches 87 and 89 to their normal positions as shown, the "sampling" operation begins and capacitors 71 assume charges reflecting values of cancellation signal weighting corresponding to the curves of FIG. 2. At the moment when switches 75 and 77 are reopened by switch actuator 79 at the end of their 3.8 microsecond "sample" period after closure, capacitors 71 will have assumed the charges representative of an optimized value of cancellation signal weighting and will "hold" this value through the remainder of the cycle. Such signal weighting, upon multiplication by the jamming signal input $J_A$ in steering mixer 41, will yield a cancellation signal which when combined through subtraction circuit 25 with the main channel signal, will be effective to cancel the jamming signal content in that channel to an optimized low level.

As previously noted in the discussion of FIG. 2, in a controlled saturation canceller loop the times required for the loop to achieve this optimized value of cancellation signal weighting for different levels of jammer signal power above saturation level fall within a relatively narrow range, so if the duration of the output pulse from one-shot multivibrator 85 is set within this range the optimized weighting may readily be derived and held. Below the saturation level of the loop there is some departure from optimum and cancellation is less complete, but it still will generally be adequate because the residue will be sufficiently below the nominal jammer uncancelled output to enable target visibility, particularly since the jammer signal input would be of relatively low amplitude for the loop to remain unsaturated.

For optimization of cancellation signal weighting with loops not embodying controlled saturation, it generally is preferable in accordance with the invention to employ adaptive control of the sample-hold circuitry in lieu of the fixed-duration sampling interval previously described. This difference results from the fact that without saturation control the loop transient weight response may vary so widely as a function of jammer power level as to make difficult the selection of a fixed duration sampling interval which is optimized over the full range of input jammer signal power levels. This difficulty is illustrated by the curves of FIG. 4, which show transient weight values versus time for a canceller loop generally similar to that previously described but omitting the controlled saturation feature.

Figure 4:
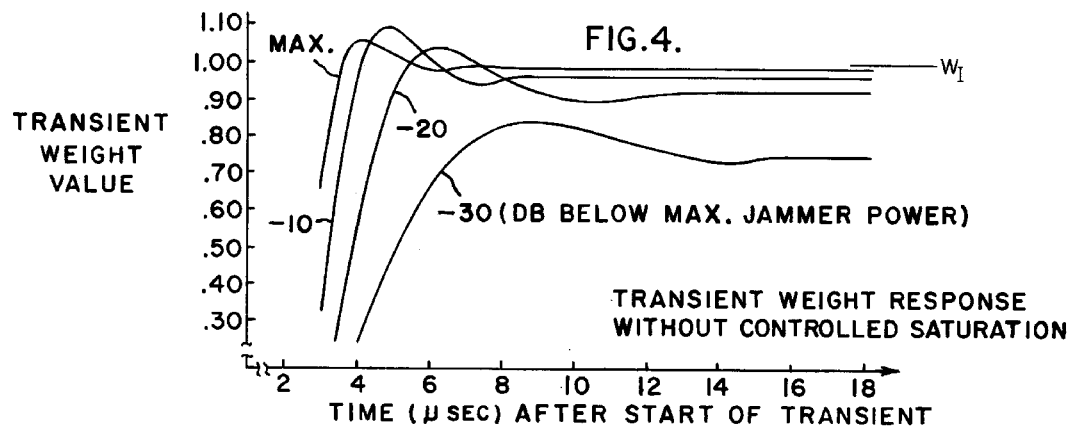
FIG. 4 is a plot illustrating relationships similar to those of FIG. 2 in a canceller not including controlled loop saturation.

As will be obvious from FIG. 4, the transient weight values vary more widely and the curves cross the $W_I$ ideal weighting point (1.0) at more widely spaced points in time. It will be noted, however, that notwithstanding this variation each of the curves still either passes through or most closely approaches the ideal weighting value $W_I$ at a point in time substantially earlier than the loop stabilization time and, further, that this earlier achieved optimum of cancellation weighting is as close or closer to the ideal weights than are the steady state weights finally attained. Accordingly, by adaptively selecting the sampling interval duration under control of one or more sensed parameters of canceller loop operation, it becomes possible to place the held value of transient weighting at or near the ideal weighting $W_I$, thus enabling the full benefits of the invention to be attained even in canceller loops of this kind.

An exemplary embodiment of a canceller affording this capability is illustrated in FIG. 5, wherein the circuit elements necessary for derivation of the in-phase and quadrature components and their recombination have, in the interests of simplicity, been omitted. The cancellation loop shown is otherwise similar to that of FIG. 3 and the corresponding components have been given like reference numerals. It should be noted that in FIG. 5, the two narrowband filter elements 101 and 103 shown do not serve I and Q channels as in FIG. 3, but rather are both part of a single channel in which the inclusion of two such elements is for an entirely different purpose as will be explained.

Since in this embodiment it is desired to sense or detect an operating parameter indicative of the achievement of an optimum value of cancellation signal weighting and then to hold that value, and since this sensing or detection process necessarily requires some finite time for its completion, it is desirable to have available, as the "held" value, a value of the cancellation weighting signal which existed at a point in time prior to conclusion of the detection process. The two similar filter and "memory" elements 101 and 103 together with the delay element 105 through which one of them receives its input, provide this desired ability to have available both the present and earlier values of cancellation signal weighting.

To determine which of the two filter elements 101 and 103 is coupled to the input of steering mixer 41 at any given time, the sample-hold switch in this embodiment comprises three poles 107, 108 and 109, the first two of which control the sampling period and the third of which operates to connect the output of filter element 103 to steering mixer 41 during the sampling period and to connect the output of filter element 101 during the "hold" period between sampling periods.

For adaptive control of the sampling operation means are provided for detecting the first to occur of two events. One such event is the crossing of the ideal weighting value ($W_I$), which is normally controlling in the case of a high amplitude jammer signal input; the other such event is the first point of zero slope of the cancellation weighting and jammer power residue curves, which is normally controlling in the case of relatively low amplitude jammer signal inputs. These represent the optimum values of cancellation signal weighting for their respective jamming signal input amplitudes, and the first to occur of the two is made controlling.

The desired detection of the pointing time at which the correction signal $J_AW$ first becomes just equal to $J_M$ may be accomplished by a power comparator 110 having $J_AW$ and $J_M$ as its two inputs and providing an output on line 111 when the $J_AW$ signal first becomes equal in amplitude to the $J_M$ signal input. A zero slope detector 113 which may utilize a differentiator or other well known technique for determining the point of zero slope, provides an output signal on line 115 when the jammer power residue signal reaches its first point of zero slope. These points of zero slope of the jammer power residue curves, in the case of zero slope detector 113, and equality of the jamming signal power levels in the main and correction signals ($J_m$ and $J_AW$), in the case of power comparator 110, are applied through a "first to occur" element which may take the form of a logic "OR" element 117 providing the "reset" input to flip-flop 119. The "set" input to this flip flop is generated by the timing pulse generator 81, with delay as at 83 to trigger the sample-andhold cycle once each transmitter interpulse period in a manner analogous to that of the circuit of FIG. 3.

The sampling periods begin at the same predetermined time following each pulse transmission, the time lapse being determined by delay 83, but the sampling periods are of different duration depending upon the moment of receipt of the reset signal from the power comparator 110 and zero slope detector 113 as just explained. During the sampling period the operative correlation is that which is coupled through narrowband filter 103, the output of this filter being coupled via switch 109 to the steering mixer 41. This accordingly is the signal which is effective in controlling operation of the power comparator and zero slope detector.

When the first of these elements responds to its respective input to generate a reset signal to flip-flop 119, the sample-hold switches 107–108 operate to disconnect both of the narrowband filter elements 101 and 103 from their respective inputs, so as to hold whatever value of cancellation signal weighting may be represented by the stored charges on each of the capacitors 71 at the end of the sampling period. At the same time switch element 109 transfers the input to mixer 41 from filter 103 to filter 101. The input signal to the steering mixer 41 then derives through time delay element 105 and narrowband filter element 101, rather than through element 103 as during the sampling period.

The result is that the "held" signal which becomes and remains the cancellation weighting signal input to the steering mixer 41, represents the correlation signal as it was at a point in time which leads that at which the signal through filter element 103 triggers the reset signal, the time differential thus established being determined by the delay element 105. This enables compensation for the finite response time of the detection and control circuitry, i.e., the circuitry necessary to detect achievement of the desired control point and to implement a control action in response thereto. In this way, the value of signal weighting as it existed at the start of the decision and control process is kept available and "held" at the conclusion of the sampling period.

As has already been said, the zero slope detector could be made to operate either on the jammer power residue signal as shown, or if preferred, it could be made responsive to the cancellation ratio $J_A W/J_M$, since the shapes of these curves are complementarily related and they have common points of zero slope. Similarly, since equality of the correction signal $J_A W$ with the main channel jamming signal $J_M$ results in a minimum of jammer power residue in the main channel, it would be possible to substitute for power comparator 110 a minimum residue detector which would be responsive to the first minimum of the residue signal in the canceller output.

Other modifications will be obvious to those skilled in the art, as for example the provision of controllability of the time of occurrence of sampling period so as to be in time correspondence with a particular range, and if desired the operation of the cancellation circuit could be inhibited when there is no jammer present. These and other modifications will be obvious to those skilled in the art and the following claims are intended to cover all such modifications as fall within their true spirit and scope.

What is claimed as new and desired to be secured by Letters Patent of the U.S. is:

1. In a canceller:
   a) a main signal transmission channel having an output terminal and an input terminal coupled to receive a signal which may include both desired and undesired signal content;
   b) an auxiliary signal transmission channel coupled to receive a signal including primarily said undesired signal;
   c) a cancellation loop including means responsive to said main and auxiliary channel signals for generating a cross correlation signal, and means for weighting said auxiliary channel signal in accordance with said cross correlation-signal to thus generate a correction signal,
   d) means for subtracting said correction signal from said main channel signal thereby to reduce its undesired signal content to a steady state level reached a predetermined period of time after application of such undesired signal to the cancellation loop; and
   e) sample-hold switch means including switch actuator means operable initially to close said cancellation loop to enable application of said undesired signal into the loop and operable after a time interval substantially shorter than said predetermined time period to open said cancellation loop and to hold the cross correlation signal then present in the loop, whereby an optimized value of said correlation signal may thus be derived and the auxiliary channel signal weighted in accordance therewith.

2. A canceller as defined in claim 1 further including control means for said sample-hold switch actuator means operable to define a sampling interval of predetermined fixed duration.

3. A canceller as defined in claim 2 wherein said control means for said sample-hold switch actuator means is adapted to be connected to a radar system having a timing pulse generator, said canceller including timing means operable to place said sampling interval in predetermined time relation with the radar timing generator pulse.

4. A canceller as defined in claim 1 further including adaptive control means for said sample-hold switch actuator means, said adaptive control means being operable to sense at least one parameter of cancellation loop operation and to respond to a predetermined value thereof to open said cancellation loop to thereby hold the cross correlation signal corresponding to that value of the sensed parameter.

5. A canceller as defined in claim 4 wherein said adaptive control means comprises means to sense the loop cancellation weighting and the predetermined value thereof to which said adaptive control means responds is either unity or the value corresponding to the first point of zero slope of the curve of cancellation weighting versus time.

6. A canceller as defined in claim 4 wherein said adaptive control means comprises means to sense the undesired signal residue in the cancellation loop output and the predetermined value thereof to which said adaptive control means responds is the first point of zero slope of the curve of undesired signal residue versus time.

7. A canceller as defined in claim 4 further including delay means and second sample-hold switch means operable by said adaptive control means conjointly with the first of said sample-hold switch means to hold said cross correlation signal as delayed in said delay means so as to correspond to a value of said sensed parameter at a point in time earlier than that to which said control means is responsive, and means for applying said cross correlation signal as sampled by said second sample-hold switch means to the weighting of said auxiliary channel signal.

* * * * *